United States Patent
Beyda et al.

(10) Patent No.: US 7,200,113 B2
(45) Date of Patent: Apr. 3, 2007

(54) APPARATUS AND METHOD FOR ISOCHRONOUS NETWORK DELAY COMPENSATION

(75) Inventors: William J. Beyda, Cupertino, CA (US); Shmuel Shaffer, Palo Alto, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 1017 days.

(21) Appl. No.: 10/174,040

(22) Filed: Jun. 17, 2002

(65) Prior Publication Data

US 2003/0231614 A1    Dec. 18, 2003

(51) Int. Cl.
    *H04J 3/24*    (2006.01)
(52) U.S. Cl. .................. 370/231; 370/351; 370/395.21; 370/401
(58) Field of Classification Search ........ 370/230–238, 370/252–253, 352–358, 401, 394, 392, 395.2
    See application file for complete search history.

(56) References Cited

U.S. PATENT DOCUMENTS

| | | | |
|---|---|---|---|
| 6,400,681 B1* | 6/2002 | Bertin et al. ................. | 370/218 |
| 6,690,678 B1* | 2/2004 | Basso et al. ................. | 370/468 |
| 6,999,420 B1* | 2/2006 | Chiu et al. ................... | 370/231 |

\* cited by examiner

*Primary Examiner*—Ricky Q. Ngo
*Assistant Examiner*—Richard Chang

(57) ABSTRACT

In an isochronous telecommunications system sending packets over two routes in a network, a server of the network compares overall transmission delay between the routes. If the new route is faster, a server buffers cells on the new route until the last cell on the old route is delivered. Then the first cell from the new route is delivered at the old delay and subsequent new route cells are delivered with the same delay. If the old route is faster, a server identifies the type of transmission; if it is voice, a signal is inserted to alert the receiver of delay, and if the transmission is video, the system resends the last frame from the old route until frames from the new route arrive.

15 Claims, 4 Drawing Sheets

APPARATUS AND METHOD FOR ISOCHRONOUS NETWORK DELAY COMPENSATION

FIELD OF THE INVENTION

This invention relates to networks and packet routing in isochronous systems.

BACKGROUND OF THE INVENTION

Networked communications can use dedicated or switched networks. With a dedicated network, a customer leases circuits that are taken out of public use. This reduces delays and eliminates congestion from outside users, but is costly, hard to configure, and susceptible to catastrophic failure.

By contrast, switched networks generally use publicly shared resources. In circuit switching, such as the publicly switched telephone network (PSTN), once a connection is established it is temporarily maintained on a continuous and exclusive basis. It offers virtually perfect performance but is highly inefficient for anything besides live uncompressed voice or video.

In packet switching, the communication is broken into individually addressed and routed packets. This greatly improves the sharing of network resources compared to a circuit-switched network, thus reducing cost. However, variable packet delays can be introduced by unpredictable variations in route length, hop count, and congestion. Live transmission of voice or video cannot depend on some protocols appropriate for data, such as retransmission of lost packets, as there is not enough time. Nonetheless, the use of packet-switched networks is expanding in response to an increase in data traffic and locations served, and the desire to mix voice and data communications Asynchronous Transfer Mode (ATM) is a type of packet switching that uses small packets (53 bytes) called "cells." Because they are small, cells can be formed very quickly (an advantage in real-time communication) and processed quickly with minimal requirements for buffer capacity. ATM is intended to be a single solution for all data types, although it is less efficient for traditional data applications such as large file transfers.

In isochronous (live) communication, ATM gathers voice or video into small packets or cells and presents these to a network in a connection-oriented manner, to deliver quality of service. (This application uses "packets" and "cells" interchangeably.) However, on a shared network, the connection is not absolutely controlled; it may be changed in mid-stream. When a new route is chosen, long gaps or dropped packets can result.

What is needed is a method to ensure smooth communication in the face of rerouted connections in cell-based networks.

SUMMARY OF THE INVENTION

In an isochronous system, when packets are being sent over both an old route and a new route, a server of the network compares the overall transmission delay between the two routes. In an isochronous telecommunications system sending packets over two routes in a network, a server of the network compares overall transmission delay between the routes. If the new route is faster, a server buffers cells on the new route until the last cell on the old route is delivered. Then the first cell from the new route is delivered at the old delay and subsequent new route cells are delivered with the same delay. If the old route is faster, a server identifies the type of transmission; if it is voice, a signal is inserted to alert the receiver of delay, and if the transmission is video, the system resends the last frame from the old route until frames from the new route arrive.

DETAILED DESCRIPTION OF THE PREFERRED EMBODIMENTS

Figure 1:
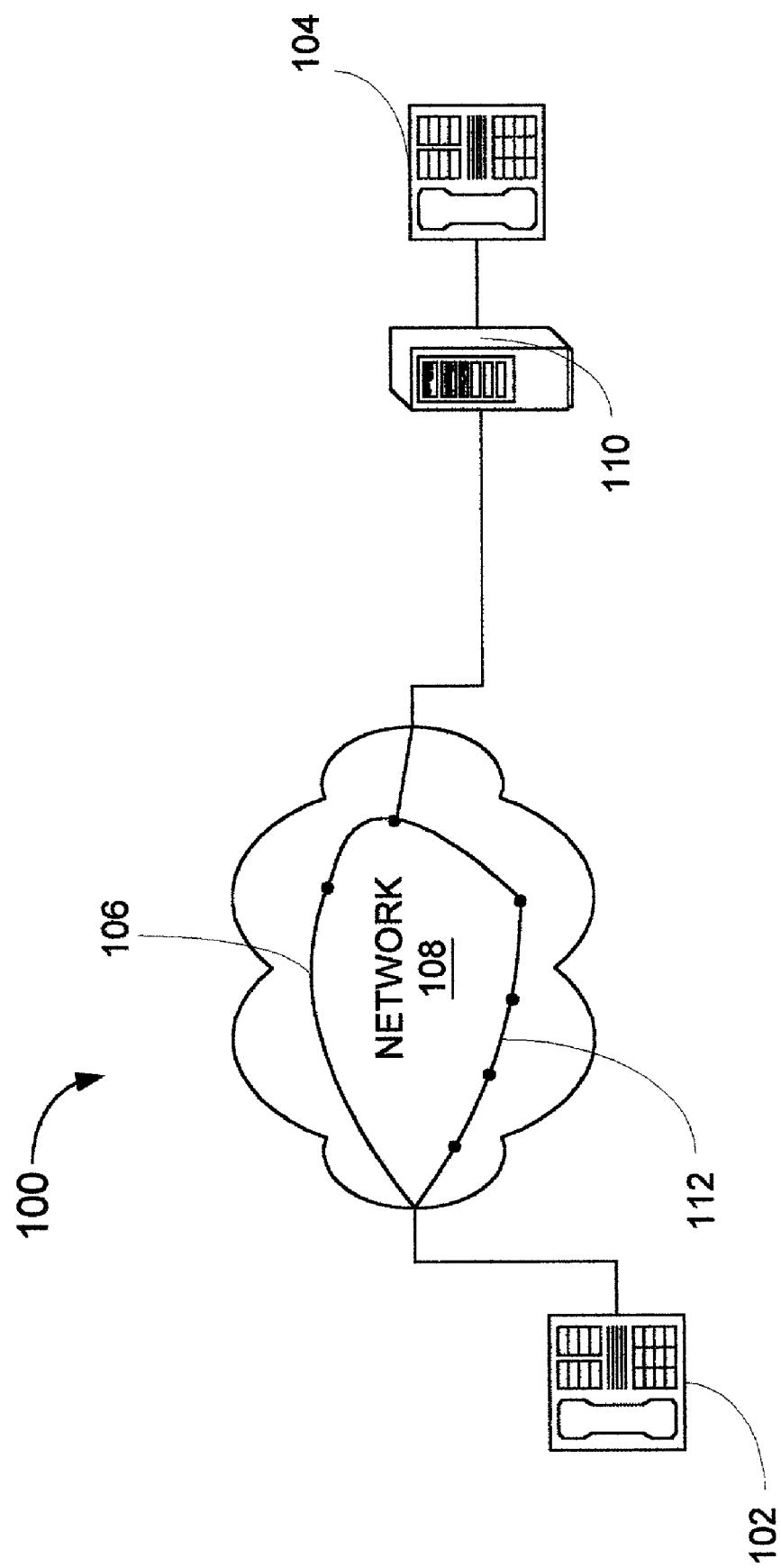
FIG. 1 illustrates a simple system of the invention.

FIG. 1 depicts a simple system 100 in accordance with the present invention. A caller on telephone 102 establishes an isochronous connection to telephone 104, through a first route 106 of network 108, and mediated by server 110 near destination telephone 104. Server 110 includes a buffer.

For any of several reasons, a second (new) route 112 is chosen. Server 110 compares the overall transmission delay between first (old) route 106 and second (new) route 112. If route 112 is faster, the server buffers cells from route 112 until the last cell from route 106 is delivered, then begins delivering the cells from route 112 with delay equal to that of the cells from route 106. If route 112 is slower, server 110 inserts a special signal to notify the user on phone 102 of the delay.

Figure 2:
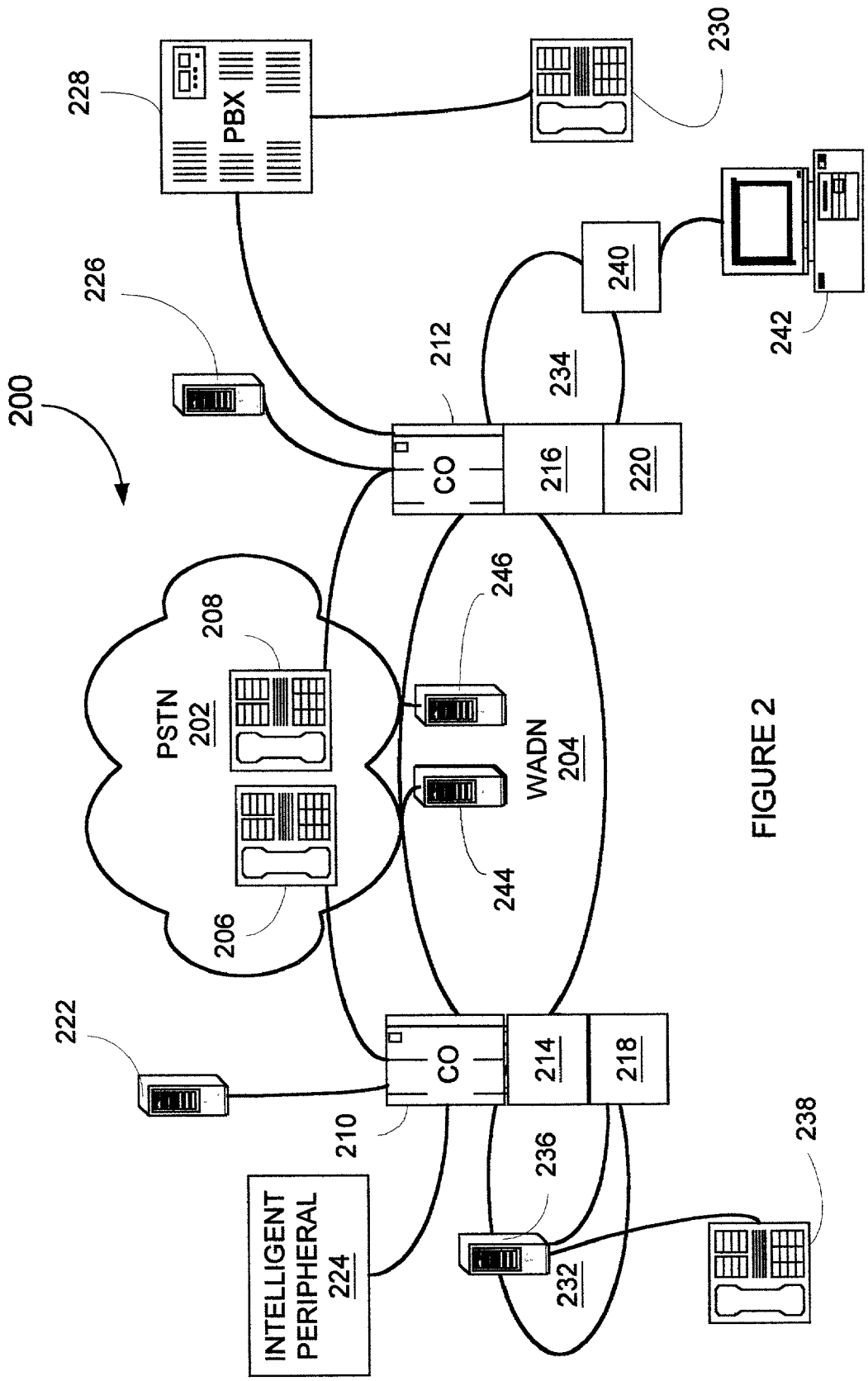
FIG. 2 depicts a complex system of the invention.

FIG. 2 depicts a complex system 200 in accordance with the present invention. The public switched telephone network (PSTN) 202 connects to the Wide Area Data Network (WADN) 204. Telephones 206 and 208 in the PSTN connect respectively to central office switches 210 and 212. Central office switches 210 and 212 include respective gateways 214 and 216 and respective routers 218 and 220. Central office switch 210 also connects to a service control point 222 and an intelligent peripheral 224. Intelligent peripheral 224 can be, for example, a printer or facsimile device. Central office switch 212 connects to a service control point 226. A private branch exchange (PBX) 228 also connects to central office switch 212. PBX 228 can be a private automatic branch exchange (PABX). A telephone 230 connects to the PBX.

The central office switches provide access to metro area access networks 232 and 234 and to WADN 204 via their gateways and routers. Metro area access network 232 includes a voice-over-internet-protocol (VoIP) gateway 236. A telephone 238 is connected to metro area access network 232. Metro area access network 234 includes a router 240. A computer 242 is connected to metro area access network 234 via router 240. WADN 204 includes a server 244 and a multimedia server 246.

Complex network 200 allows communication between and among components in both isochronous and asynchronous systems. Systems that rely on isochronous connections include (but are not limited to) two-way voice communications (including local, switched long distance, and toll-free telephone numbers), mobile telephone, and personal digital assistant (PDA) services. Systems that rely on asynchronous connections include store and forward messaging, narrowband data, instant messaging and signaling, and internet protocol (IP) interactive sessions and bursty object and/or image transfer. Streaming and videoconferencing use both asynchronous and isochronous systems.

Complex system 200 illustrates connections between components via switched networks. Switches in system 200 include edge switches such as Central Offices 210 and 212, and PBX 228, hybrid switches such as routers 218 and 220, and switches that effect protocol conversions, such as gateways 214, 216, and 236. Each switch receives traffic and analyzes the destination address. (Some switches also analyze the originating address.) The switch consults a routing table, determines the appropriate outgoing port, and forwards the data. Complex system 200 enables calls from any end user to any other end user to be established, maintained and terminated.

Connections in complex system 200 also are subject to new route selection. For isochronous applications, or for isochronous aspects of applications such as multimedia that use both asynchronous and isochronous systems, servers such as servers 222, 226, 244, and 246, or servers in components such as in any of gateways 214, 216, or 236, and routers 218, 220 and 240 can compare overall transmission delay between an old and a new route. Analogously to system 100, if the new route is faster, the server will buffer cells from the new route until the last cell from the old route is delivered. Then, the server will begin delivering cells from the new route with delay equal to the delay from the new route.

On the other hand, if the old route is faster, the server inserts a special signal to notify a user at PSTN-connected telephone 206 or 208, PBX telephone 230, computer 242, and/or intelligent peripheral 224 of the delay.

Figure 3:
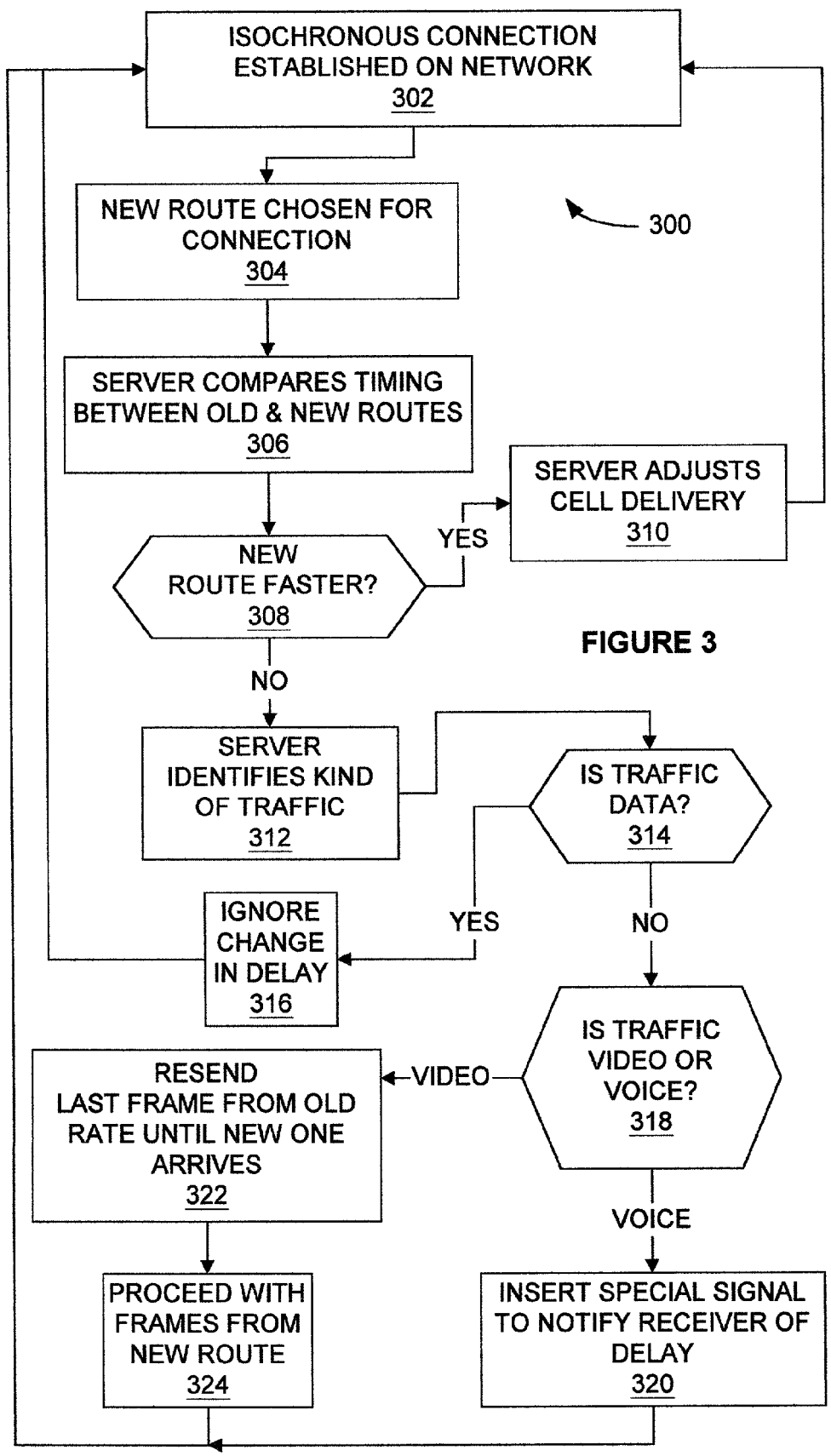
FIG. 3 is a flow chart of a method of the invention.

FIG. 3 depicts a method 300 in accordance with the present invention. In step 302, an isochronous connection is established on a first route within a network. At step 304, a new route is chosen for the connection. At step 306, a server compares timing between the old and new routes. At a step 308, it is determined whether the new route is faster.

If the new route is faster, at step 310 the server adjusts the cell delivery. The method then loops back to step 302. If the new route is not faster, at step 312 the server identifies the kind of traffic. Step 314 tests whether the traffic is data. If the traffic is data, the server ignores the change in delay, at step 316, and the method loops back to step 302. If the traffic is not data (i.e., the determination at step 314 is "no"), the server then determines whether the traffic is video or voice, at step 318. If the traffic is voice, a special signal is inserted, at step 320, to notify the receiver of the delay. The signal can be, for example, a tone, silence, pre-recorded announcement, or other notifier. The method then loops back to step 302.

If step 318 determines that the traffic is video, the server resends the last frame from the old route until a new video frame arrives, at step 322. The server then proceeds with frames from the new route, at step 324, and the method then loops back to step 302.

Figure 4:
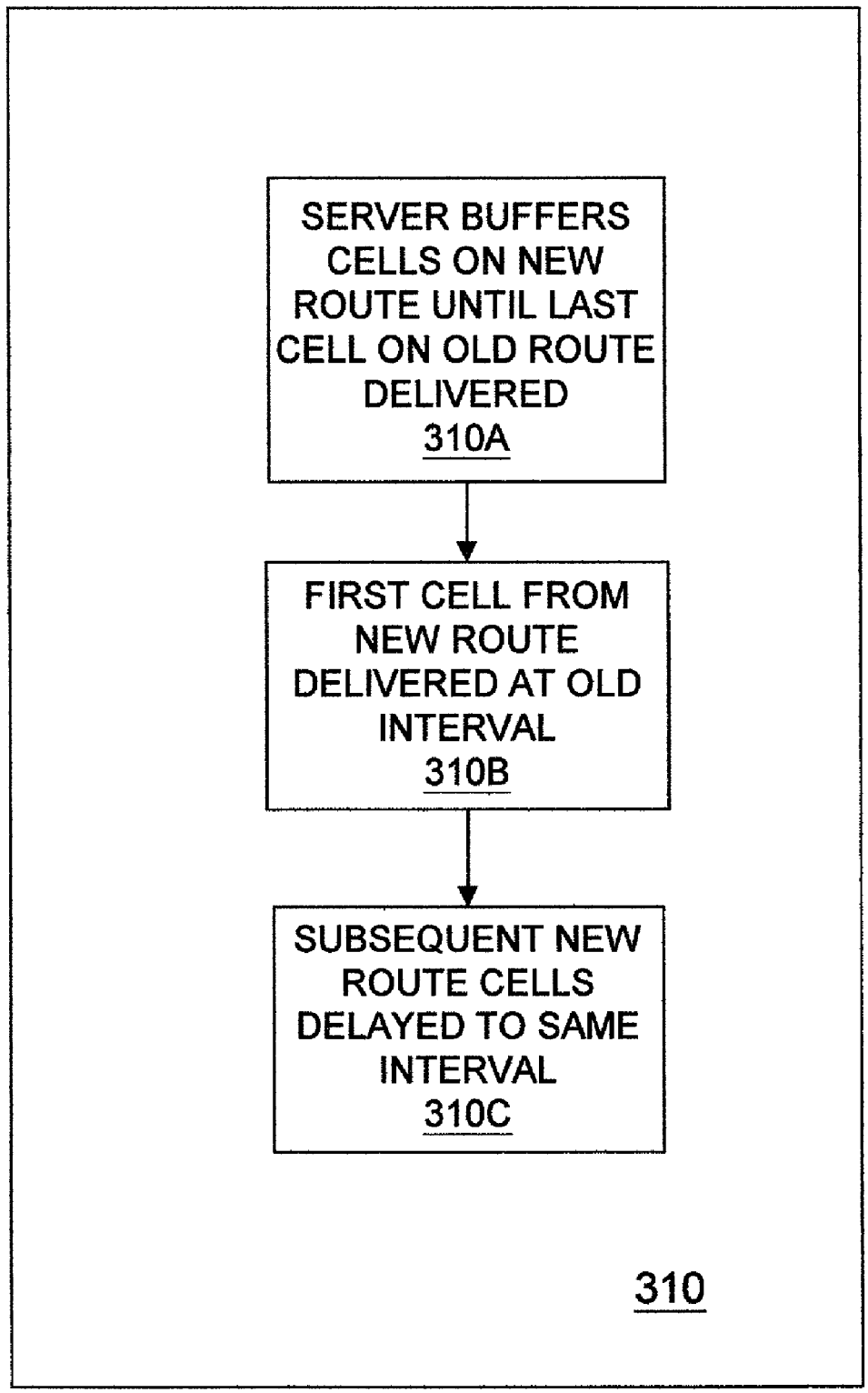
FIG. 4 is a flow chart of substeps of step 310 of FIG. 3.

FIG. 4 depicts substeps of step 310 of the method of FIG. 3 (cell delivery adjustment when the new route is faster). The server buffers cells on the new route until the last cell on the old route is delivered, at step 310A. Then the first cell from the new route is delivered at the old delay, at step 310B. At step 310C, subsequent new route cells are delivered with the same delay.

The compatibility of the invention with the use of other components and systems will be known to those skilled in the art. The invention can be applied to any packet-, cell-, or frame-based network carrying isochronous traffic. While this description focuses on ATM networks, it could be used in IP networks carrying voice and video traffic as well. While not all IP networks posses quality of service functions and control over latency and jitter to the extent necessary to make this invention usable, some of them are being enhanced with these functions and could take advantage of this invention as well. Those skilled in the art will be aware of numerous variations within the bounds of the invention, the scope of which is limited only by the following claims.

The invention claimed is:

1. A system for isochronous network delay compensation on a connection between two telecommunication stations, said two telecommunications stations defining a first end and a second end of the connection, comprising:
    a network that supports plural routes between components, packets being capable of being sent along a first route and along a second route;
    a server, the server being connected to a processor, said processor comparing end-to-end packet delay of packets being transmitted along the first route with end-to-end packet delay of packets being sent along the second route;
    wherein if the end-to-end delay on the second route is less than the end-to-end delay on the first route, the server buffering packets being transmitted along the second route until the last packet from the first route is delivered; and
    the server then delivering the packets being transmitted along the second route with delay equal to the delay of packets being transmitted along the first route; and
    further wherein if the end-to-end delay on the first route is less than the end-to-end delay on the second route, the server inserting a signal that signifies the second-route delay.

2. The system of claim 1 in which the second route is chosen after the first route is established.

3. The system of claim 1 in which the signal is a tone.

4. The system of claim 1 in which the signal is silence for a predetermined interval.

5. The system of claim 1 in which the signal is a pre-recorded announcement.

6. A method for isochronous network delay compensation comprising the following steps:
    establishing an isochronous connection on a network, said connection using a first route for packets to be sent over said network, and a server including a processor;
    a second route being chosen on the network;
    the server comparing end-to-end delay between the first route and the second route;
    if the second route is faster, the server
        buffering packets from the second route until the last packet from the first route is delivered;
    delivering the first packet from the second route at a delay interval equal to the delay interval of the first route; and
        delaying subsequent packets from the second route to the same delay interval;
    if the second route is slower, the server identifying the type of call, and
        if the call is a data transmission, making no adjustment in the delay;
        if the call is voice, inserting a special signal that provides notification of the delay; and
        if the call is video, resending the last frame from the old rate until a packet from the new rate arrives, and then proceeding with packets from the new rate.

7. The method of claim 6 in which the second route is chosen after the first route.

8. The system of claim 1 in which the data network is an Asynchronous-Transfer-Mode-based network.

9. The system of claim 1 in which the data network is an Internet-Protocol-based network.

10. The method of claim 6 in which the network is an Asynchronous-Transfer-Mode-based network.

11. The method of claim 6 in which the network is an Internet-Protocol-based network.

12. A method for isochronous network delay compensation comprising the following steps:
    establishing an isochronous connection on a network, said connection using a first route for packets to be sent over said network;
    selecting a second route being chosen on the network;
    comparing end-to-end delay between the first route and the second route;
    if the second route is faster, then
    buffering packets from the second route until the last packet from the first route is delivered;
    delivering a first packet from the second route at a delay interval equal to the delay interval of the first route; and
    delaying subsequent packets from the second route to the same delay interval;
    if the second route is slower, then
    identifying a type of call; and
        if the call is a data transmission, making no adjustment in the delay;
        if the call is voice, inserting a special signal that provides notification of the delay; and
        if the call is video, resending the last frame from the old rate until a packet from the new rate arrives, and then proceeding with packets from the new rate.

13. The method of claim 12 in which the second route is chosen after the first route.

14. The method of claim 12 in which the network is an Asynchronous-Transfer-Mode-based network.

15. The method of claim 12 in which the network is an Internet-Protocol-based network.

* * * * *